Dec. 22, 1931.  H. B. GREENWOOD  1,837,617
BEARING SUPPORT FOR COMPOSITION INKING ROLLERS
Filed July 9, 1928  2 Sheets-Sheet 1
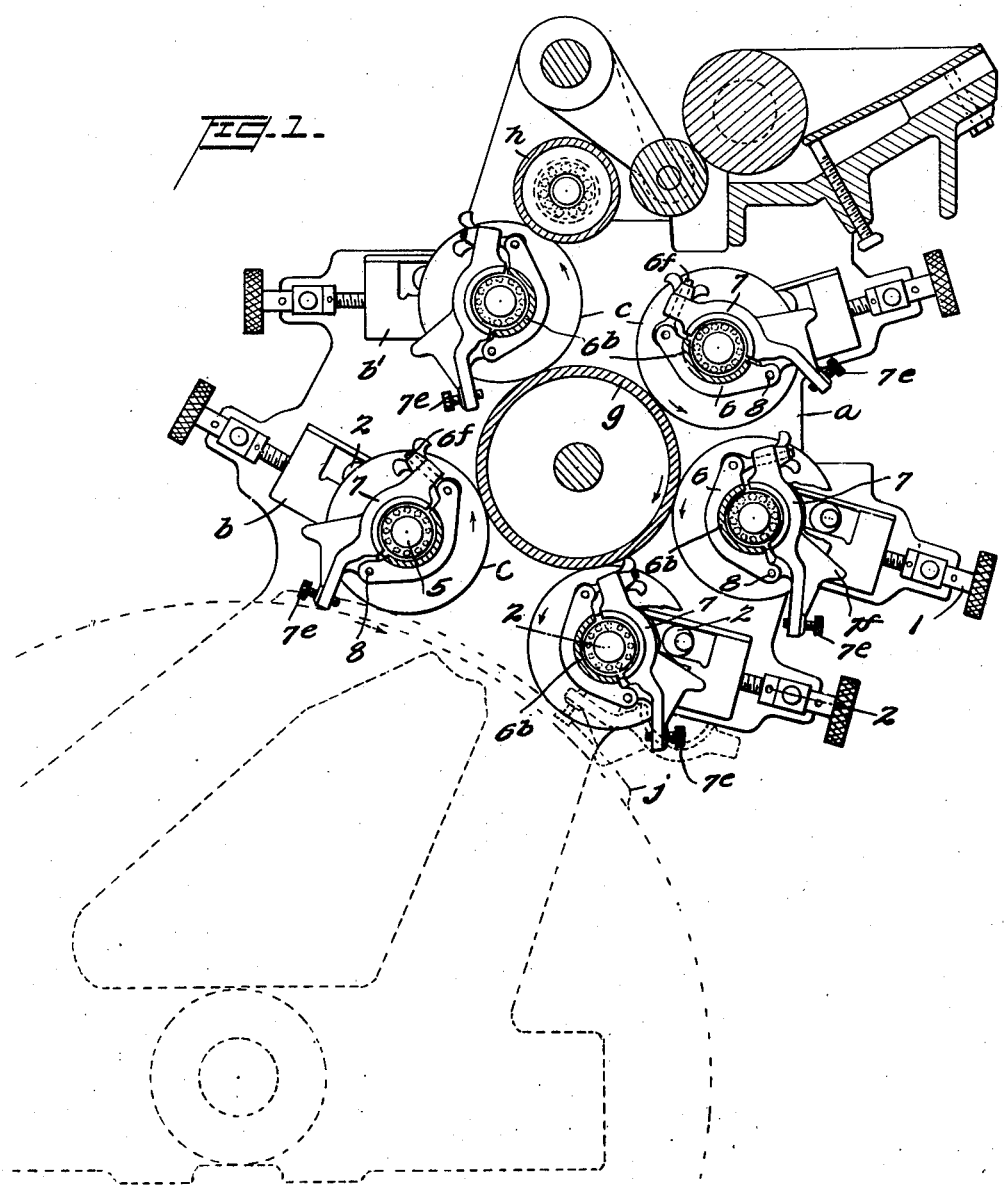
INVENTOR.
H. B. Greenwood
BY
Robert Watson
ATTORNEY.

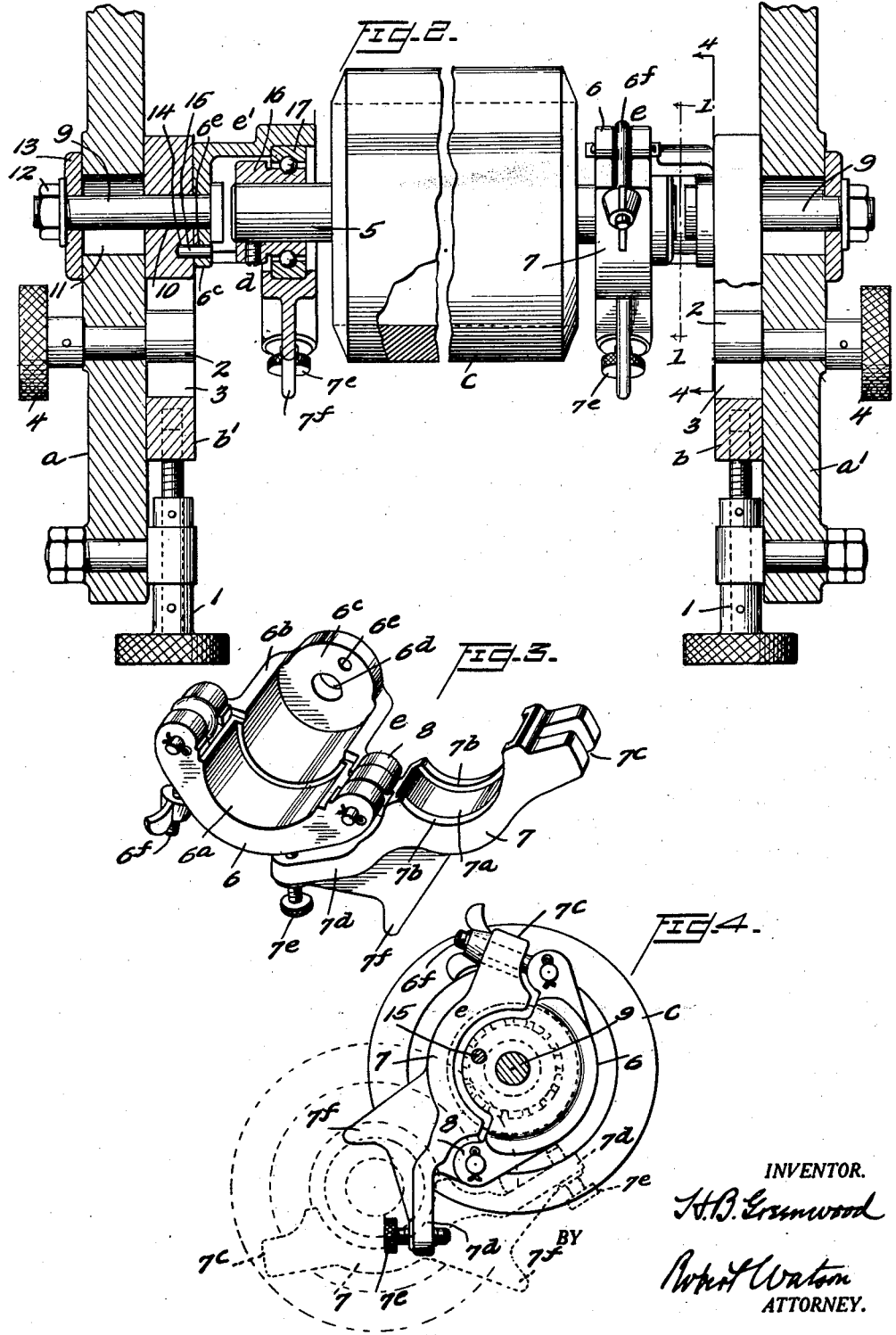

Patented Dec. 22, 1931

1,837,617

UNITED STATES PATENT OFFICE

HENRY B. GREENWOOD, OF GLENARM, MARYLAND, ASSIGNOR TO F. X. HOOPER COMPANY, INC., OF GLENARM, MARYLAND, A CORPORATION OF MARYLAND

BEARING SUPPORT FOR COMPOSITION INKING ROLLERS

Application filed July 9, 1928. Serial No. 291,396.

This invention relates to means for mounting the composition inking rollers of printing presses. When a printing press is not in use, if the composition inking rollers are left standing in contact with the metal rollers or form cylinders, the composition rollers are apt to become slightly deformed along the line of contact. It is desirable, therefore, to have means whereby the composition rollers can be readily moved out of contact with the metal rollers when the press is stopped, and returned to exact positions, in contact with the metal surfaces, when the press is to be used. In carrying out the invention, I provide adjustable supports on the brackets which carry the inking attachment, and split clamps are secured to these supports, each clamp comprising two hingedly connected members, one of which is stationary and the other movable. Ball bearings are mounted upon the ends of the shafts of the composition rollers, each bearing comprising an inner raceway, which is secured to the shaft, and an outer cylindrical raceway. When the press is in use, the clamps grip the outer raceways and hold the composition rollers in correct working positions. When the press is stopped, the movable members of the clamps are swung outwardly from the fixed members into positions where they serve as receptacles for the roller bearings. By then moving the composition rollers away from the metal rollers, the outer raceways, on the shafts of the former, roll from the fixed members on the clamps into the recesses in the movable members. To return the composition rollers to their working positions, the rollers are pushed toward the metal rollers, and the outer raceways on the shafts of the composition rollers roll into the recesses in the fixed members of the clamps. The movable members of the clamps are then swung to their closed positions and secured to the fixed members, and the outer raceways of the bearings are thus held firmly by the clamps.

In the accompanying drawings,

Fig. 1 is a vertical section through the inking attachment of a printing press, showing a plurality of composition rollers having ball bearings mounted in clamps, in accordance with my invention, the stationary clamping members being shown in section on the line 1—1 of Fig. 2;

Fig. 2 is a section through the brackets which support the inking rollers, taken about on the line 2—2 of Fig. 1, showing a composition roller partly broken away, the clamp and roller bearing at one end of the cylinder being shown in central section, and the clamp and bearing at the other end of the roller being shown in elevation;

Fig. 3 is a perspective view of one of the clamps; and,

Fig. 4 is a section on the line 4—4 of Fig. 2, the movable clamping member being shown in its open position in dotted lines, and the composition roller being similarly shown supported by said member.

Referring to the drawings, $a$ and $a'$ indicate the brackets of a printing press which support the inking rollers, and $b$, $b'$ indicate adjustable supports, mounted on the brackets, for supporting the composition rollers. These supports, which form no part of the present invention, are adjustable by means of swiveled adjusting screws 1 and by cams 2, arranged in slots 3 in the supports, and adapted to be moved by finger-pieces 4. The adjusting screws 1 adjust the supports longitudinally, and the cams 2 adjust them laterally, and when the supports are in the proper position to hold the composition rollers in contact with the metal rollers, the supports are clamped to the brackets, as hereinafter explained.

Each composition roller $c$ has a roller bearing $d$ at each end of its shaft 5, and these bearings are arranged within clamps $e$, $e'$, which are mounted upon supports $b$, $b'$. Each clamp, as shown in Fig. 3, comprises members 6 and 7, which are connected together by a hinge joint 8. The member 6 has an arcuate inner face $6^a$, and it has a semi-cylindrical extension $6^b$, at one side, and a flange $6^c$ at the end of said extension. This flange has a circular opening $6^d$ extending through it, this opening being concentric with the arcuate face $6^a$. The flange also has an opening $6^e$, adapted to receive a dowel pin. The member 7 of the clamp has an arcuate face 7ª, which is opposed to the face 6ª of the member 6 when the clamp is closed, and at the sides of the face 7ª the member 7 has ribs or flanges 7ᵇ. A slot 7ᶜ is formed in the free end of the member 7 and this slot is adapted to receive a clamping screw 6ᶠ, which is hinged to the member 6, as shown. The member 7 has an arm 7ᵈ, projecting beyond its pivotal point and this arm is provided with an adjusting screw 7ᵉ. A fin 7ᶠ projects from the back of the member 7 and constitutes a fingerpiece by which the member can be rocked by hand about its pivotal point.

In mounting the clamps upon the adjustable supports b, b', a clamping screw 9 is passed through the opening 6ᵈ in the flange 6ᶜ and then through an opening 10 in the support, thence through slot 11 in the bracket, and by means of a nut 12 and washer 13 on the clamping screw, the parts are drawn together. The clamps may be set in any desired position around the axis of the clamping screw 9 by adjusting the clamp member 6 to the desired position, then drilling a hole 14 in the adjustable support in line with the hole 6ᵉ in the flange 6ᶜ of the member 6 and then driving a dowel pin 15 into these holes.

Each roller bearing d comprises an inner raceway 16, which is fixed on the shaft 5, and an outer cylindrical raceway 17, the latter adapted to be gripped by the clamp members 6 and 7, when the latter are in closed position. The clamps are arranged upon the supporting means in such positions that when the member 7 of the clamp is opened, as shown in full lines in Fig. 3, and in dotted lines in Fig. 4, the arcuate surfaces 7ª of the member 7 will serve as a receptacle for the outer raceway 17 of one of the bearings. Thus, as illustrated in Fig. 4, when the members 7 are opened, the composition roller may be pulled away from the metal roller, and the outer raceways 17 will roll over the hinge joint 8 and on to the arcuate faces of the members 7. In this movement, the flanges 7ᵇ guide the outer raceways. When it is desired to return a composition roller to its working position, it is pushed from the movable clamping members toward the metal roller, and in this movement the outer raceways roll over the hinged joints and into the arcuate recesses of the stationary clamp members. The latter members are then closed and, by means of the clamping screws 6ᶜ, the two parts of each clamp are caused to grip the outer raceways. The arms 7ᵈ, when the clamps are opened, engage the backs of the stationary members 6, either directly or indirectly, through the adjusting screws 7ᵉ, and these arms therefore serve as stops for positioning the movable members when the latter are in their open position.

The clamps at each end of any individual composition roller will be set exactly alike with respect to the frame and supporting devices; but the pairs of clamps which support the several rollers may be differently positioned, as shown in Fig. 1, the arrangement being such that in any case the movable members of the clamps, when swung to the open position, will serve as receptacles for the bearings of a roller.

It will be evident from an inspection of Fig. 1, that when the movable clamping members are opened, the several composition rollers c may be rolled into the movable members and out of engagement with the metal cylinder g, and that when the rollers are moved back into the stationary members 6, they will engage the cylinder. Also, the roller which engages the metal cylinder h and those rollers which engage the form j on the form cylinder will be moved out of contact with these metal surfaces when the rollers are moved into the open clamping members.

What I claim is:

1. In inking mechanism for printing presses, the combination with a metal roller and a composition roller adapted to bear against the same, of ball bearings on the shaft of the latter roller, each bearing comprising an inner raceway secured to the shaft and an outer cylindrical raceway, and clamps for supporting the bearings adapted to bear directly against the outer raceway, each clamp comprising two members hinged together and having complementary arcuate recesses for receiving the outer raceway of a bearing, one member being fixed to the press and the other member adapted to swing into position to receive and support the bearing when the clamp is opened.

2. In inking mechanism for printing presses, the combination with a metal roller and a composition roller adapted to bear against the same, of ball bearings on the shaft of the latter roller, each bearing comprising an inner raceway secured to the shaft and an outer cylindrical raceway, and clamps for supporting the bearings adapted to bear directly against the outer raceway, each clamp comprising two members hinged together and having complementary arcuate recesses for receiving the outer raceway of a bearing, one member being fixed to the press and the other member adapted to swing into position to receive and support the bearing when the clamp is opened, said latter member having flanges at its sides for guiding the outer raceway.

3. In inking mechanism for printing presses, the combination with a metal roller and a composition roller adapted to bear against the same, of ball bearings on the shaft of the latter roller, each bearing comprising an inner raceway secured to the shaft and an outer cylindrical raceway, and clamps for supporting the bearings adapted to bear directly against the outer raceway, each clamp comprising two members hinged together and having complementary arcuate recesses for receiving the outer raceway of a bearing, one member being fixed to the press and the other member adapted to swing into position to receive and support the bearing when the clamp is opened, said latter member having an arm adapted to engage the outer side of the fixed member to limit the movement of the movable member.

4. In inking mechanism for printing presses, the combination with a metal roller and a composition roller adapted to bear against the same, of ball bearings on the shaft of the latter roller, each bearing comprising an inner raceway secured to the shaft and an outer cylindrical raceway, and clamps for supporting the bearings adapted to bear directly against the outer raceway, each clamp comprising two members hinged together and having complementary arcuate recesses for receiving the outer raceway of a bearing, one member being fixed to the press and the other member adapted to swing into position to receive and support the bearing when the clamp is opened, said latter member having an arm projecting therefrom, and an adjusting screw in said arm adapted to engage the outer side of the fixed member.

In testimony whereof I affix my signature.

HENRY B. GREENWOOD.